US008296830B2

(12) United States Patent
Narita

(10) Patent No.: US 8,296,830 B2
(45) Date of Patent: Oct. 23, 2012

(54) MANAGEMENT APPARATUS AND CONTROL METHOD OF MANAGEMENT APPARATUS

(75) Inventor: Tateki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 12/463,233

(22) Filed: May 8, 2009

(65) Prior Publication Data

US 2009/0282465 A1 Nov. 12, 2009

(30) Foreign Application Priority Data

May 12, 2008 (JP) ................................. 2008-124616

(51) Int. Cl.
*G06F 15/16* (2006.01)
*H04L 9/32* (2006.01)
(52) U.S. Cl. ................. 726/6; 726/4; 713/168
(58) Field of Classification Search .................. 726/6, 4; 713/168
See application file for complete search history.

(56) References Cited

U.S. PATENT DOCUMENTS 7,222,361 B2 * 5/2007 Kemper ........................... 726/4
7,506,054 B1 * 3/2009 Fuh et al. ...................... 709/225

FOREIGN PATENT DOCUMENTS

JP 2007-243840 A 9/2007

* cited by examiner

*Primary Examiner* — Philip Lee
(74) *Attorney, Agent, or Firm* — Canon U.S.A., Inc., IP Division

(57) ABSTRACT

A management apparatus capable of communicating with a plurality of external devices includes a storage unit to store management information including authentication information for authenticating a user in the external device, a first transmission unit to transmit an authentication result of the user in the external device and user information necessary for authenticating the user by the external device among the management information to the external device by referring to the management information stored in the storage unit in response to a request from the external device, a selection unit to, when a content of the management information is changed, select an external device to be a transmission destination of the changed management information based on the change thereof, and a second transmission unit to transmit the changed management information to the external device selected by the selection unit.

6 Claims, 11 Drawing Sheets

FIG.3A
USER INFORMATION LIST

| 301 | 302 | 303 | 304 | 305 | 306 |
|---|---|---|---|---|---|
| USER NAME | USER ID | PASSWORD | USAGE FREQUENCY OF EACH IMAGE PROCESSING APPARATUS | FUNCTION LIMITATION INFORMATION | USER AREA INFORMATION |
| User1 | 001 | xxxx | USAGE FREQUENCY OF IMAGE PROCESSING APPARATUS 1<br>USAGE FREQUENCY OF IMAGE PROCESSING APPARATUS 2<br>USAGE FREQUENCY OF IMAGE PROCESSING APPARATUS 3<br>. . . | COLOR PRINTING: PROHIBITED<br>ONE-SIDED PRINTING: PROHIBITED<br>TRANSMISSION FUNCTION: PROHIBITED<br>. . . | FLOOR A |
| User2 | 002 | yyyy | USAGE FREQUENCY OF IMAGE PROCESSING APPARATUS 1<br>USAGE FREQUENCY OF IMAGE PROCESSING APPARATUS 2<br>USAGE FREQUENCY OF IMAGE PROCESSING APPARATUS 3<br>. . . | COLOR PRINTING: PERMITTED<br>ONE-SIDED PRINTING: PERMITTED<br>TRANSMISSION FUNCTION: PERMITTED<br>. . . | FLOOR B |

FIG.3B
DEVICE INFORMATION LIST

| 307 | 308 | 309 | 310 |
|---|---|---|---|
| DEVICE NAME | DEVICE ID | FUNCTION INFORMATION | DEVICE AREA INFORMATION |
| Device1 | 1 | COLOR PRINTING: ○<br>BOTH-SIDED PRINTING: ○<br>TRANSMISSION FUNCTION: × | FLOOR A |
| Device2 | 2 | COLOR PRINTING: ×<br>BOTH-SIDED PRINTING: ×<br>TRANSMISSION FUNCTION: ○ | FLOOR B |

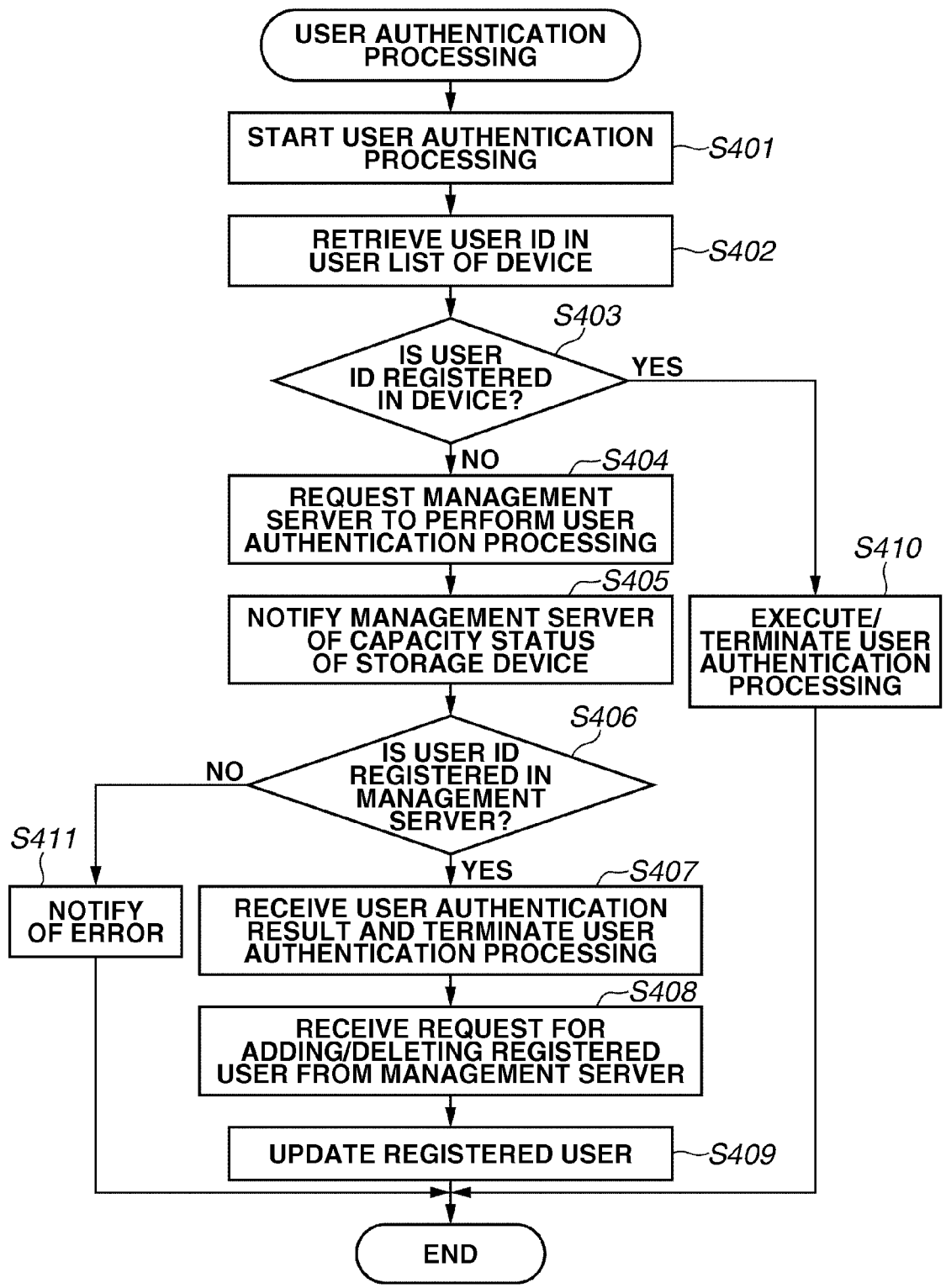

MANAGEMENT SERVER SIDE

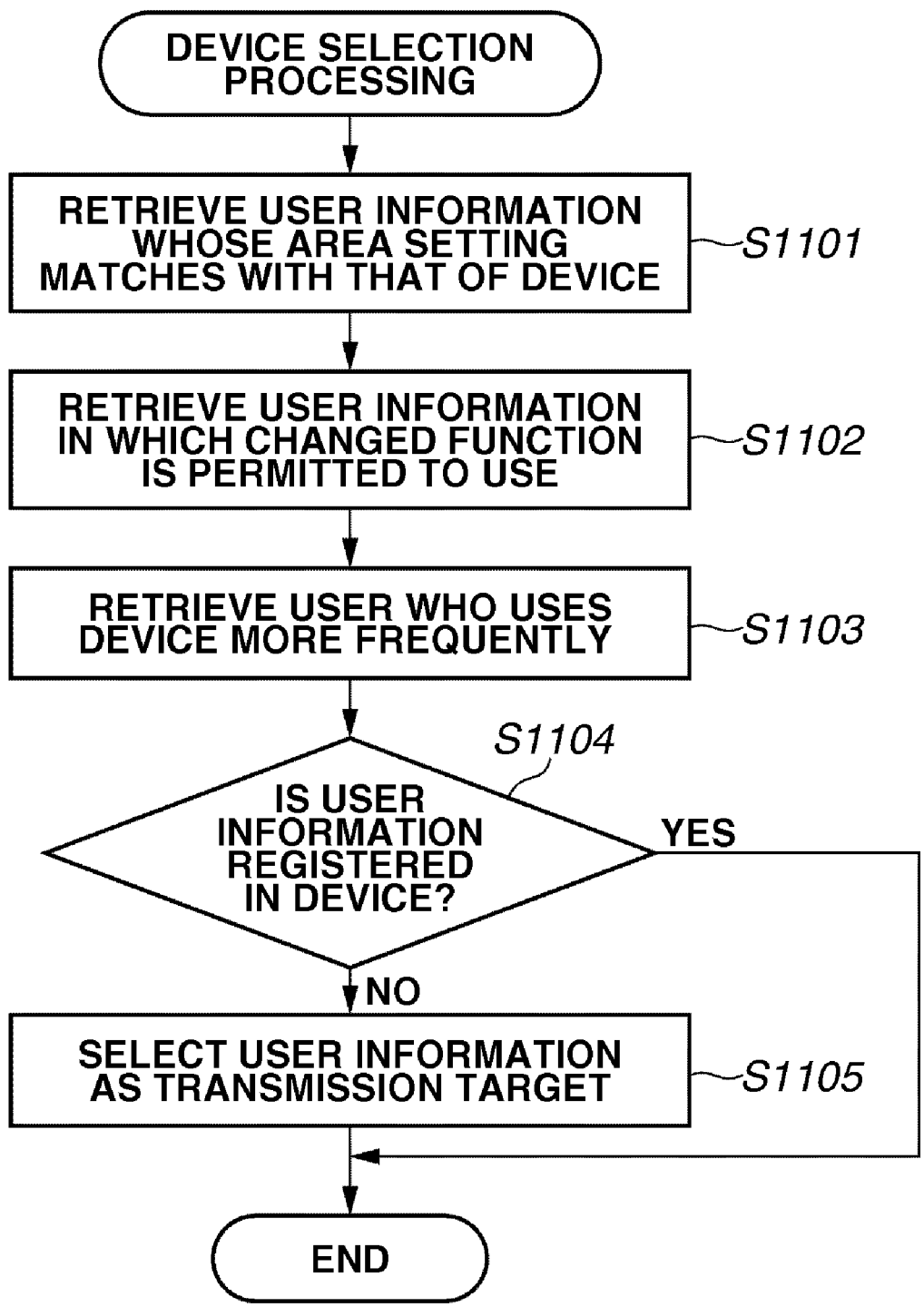

MANAGEMENT APPARATUS AND CONTROL METHOD OF MANAGEMENT APPARATUS

BACKGROUND OF THE INVENTION

1. Field of the Invention

The present invention relates to a management apparatus (e.g., a management server) capable of exchanging information with external devices (e.g., image processing apparatuses) via a network, and to a control method of the management apparatus. More particularly, the present invention relates to a management apparatus characterized in a technique of transmitting management information including user information and device information to external devices and a control method of the management apparatus.

2. Description of the Related Art

Nowadays, multifunction peripherals used in offices (hereinafter, referred to as image processing apparatuses) begin to incorporate a login function for performing user authentication processing when a user operates them.

Conventionally, the user information to be used in a login function may be stored in a management server connected via a network, or in an image processing apparatus.

If the user information is stored in the management server, the user authentication processing is performed via the network from the image processing apparatus. This is referred to as via-network authentication. On the other hand, if the user information is stored in the image processing apparatus, the image processing apparatus itself performs the user authentication processing without using the management server. This is referred to as local authentication.

The via-network authentication takes longer processing time compared with the local authentication. On the other hand, to perform the local authentication, the image processing apparatus itself needs to store the user information. However, a mass-storage device is necessary to register all pieces of the user information about many users, and an image processing apparatus that is not equipped with such a storage device cannot store all pieces of the user information.

In view of the above-described features, a system is discussed in which user information and device information of image processing apparatuses are stored in a management server, and a part thereof is stored in each image processing apparatus. The system firstly refers to a device inside (i.e. the image processing apparatus), and secondly refers to the management server with respect to the user information for user authentication processing. Therefore, while collectively managing the user information in the management server, a user can use a login function in local authentication at high speed.

Japanese Patent Application Laid-Open No. 2007-243840 discusses a technique in which a plurality of image processing apparatuses constitute a virtual sub-network, and user information stored in each apparatus can be shared each other and referred to when a login function is executed.

The above-described image processing apparatus has a login unit for logging therein and a login unit for lobbing in the virtual sub-network. The image processing apparatus can refer to the user information that other image processing apparatuses have and perform user authentication processing by the login unit for the virtual sub-network.

As described above, however, even a system that uses the local authentication and the via-network authentication in combination in the login function, a volume of information that can be stored within the image processing apparatus is limited. Particularly, a small-sized image processing apparatus that is not equipped with a mass-storage device has a small storage capacity.

Thus, if the user information to be stored within the image processing apparatus is not optimized for a user who uses the image processing apparatus, the image processing apparatus cannot perform the local authentication.

Accordingly, in order to allow a user to use local authentication at the fastest speed, information stored within an image processing apparatus needs to be optimally updated whenever necessary according to user information and device information.

SUMMARY OF THE INVENTION

The present invention is directed to a management apparatus capable of optimally transmitting management information including user information and device information to an external device (an image processing apparatus) according to usage frequency, area setting and function limitation.

According to an aspect of the present invention, a management apparatus capable of communicating with a plurality of external devices includes a storage unit configured to store management information including authentication information for authenticating a user in the external device, a first transmission unit configured to transmit an authentication result of the user in the external device and user information necessary for authenticating the user by the external device among the management information to the external device by referring to the management information stored in the storage unit in response to a request from the external device, a selection unit configured to, when a content of the management information is changed, select an external device to be a transmission destination of the changed management information based on the change thereof, and a second transmission unit configured to transmit the changed management information to the external device selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate examples of a format of management information used in the image processing system of FIG. 1.

FIG. 4 is a flowchart illustrating a procedure for user authentication processing on a device side, when user authentication processing is requested by the device in FIG. 1.

FIG. 11 is a flowchart illustrating a procedure for device selection processing executed in step S603 of FIG. 6, when management information (function information of a device) stored in a management server in FIG. 1 is changed.

DETAILED DESCRIPTION OF THE EMBODIMENTS

Various exemplary embodiments, features, and aspects of the invention will be described in detail below with reference to the drawings.

Figure 1:
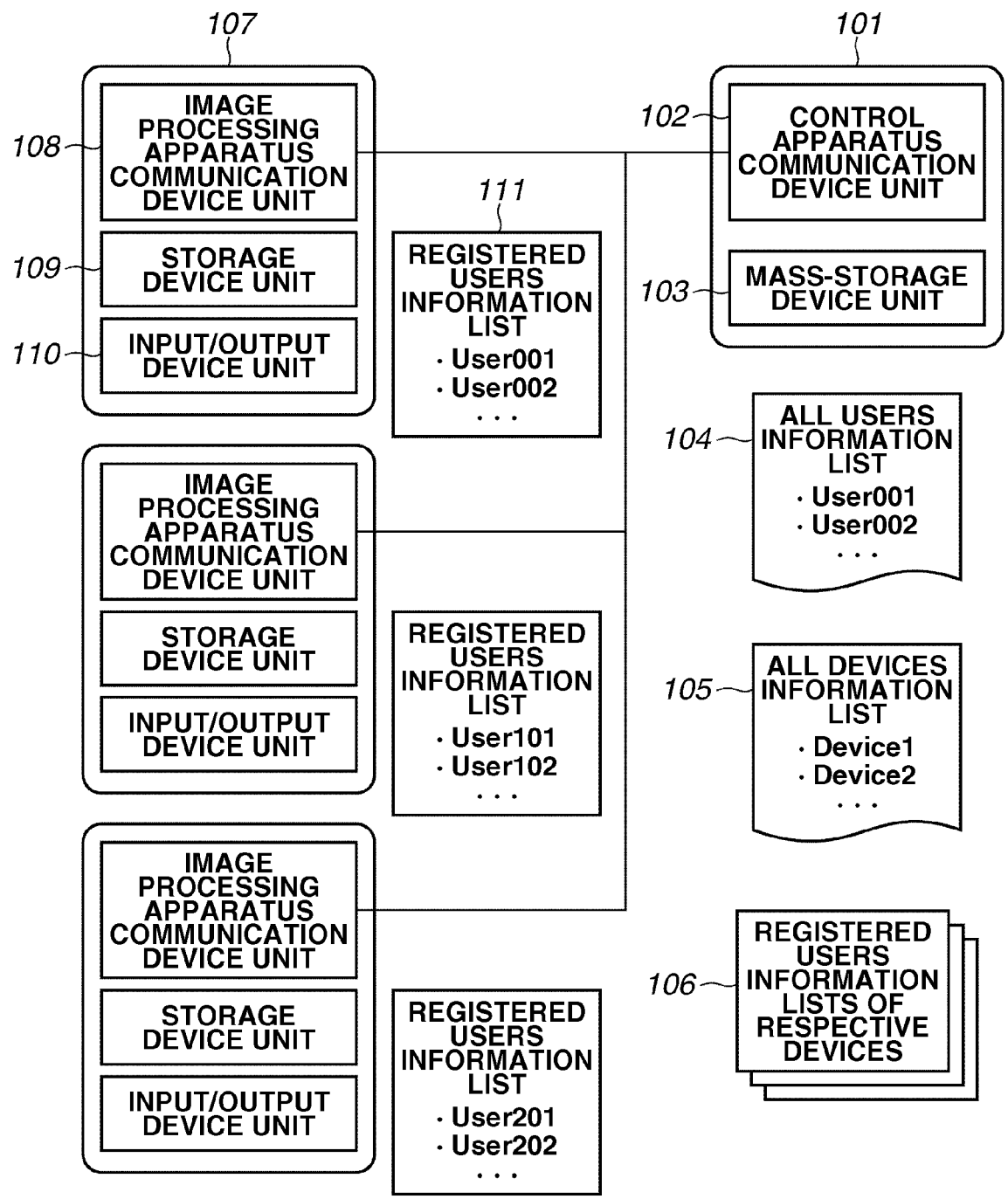
FIG. 1 illustrates an example of a system configuration diagram of a management apparatus and image processing apparatuses in an image processing system in which the management apparatus and image processing apparatuses are connected by a network according to an exemplary embodiment of the present invention.

FIG. 1 illustrates a system configuration diagram of a management apparatus and image processing apparatuses in an image processing system in which the management apparatus and the image processing apparatuses are connected by a network according to an exemplary embodiment of the present invention.

The image processing system includes a management server as an example of the management apparatus and an image processing apparatus 107 as an example of external devices which are connected via a network. Each of the apparatuses that are connected via the network can communicate with one another.

In the image processing system in the present exemplary embodiment, a plurality of image processing apparatuses is connected. Hereinafter, the image processing apparatus 107 is described as an example of the image processing apparatus, although the description is also applicable to other image processing apparatuses. A management server 101 includes a server for user authentication such as, an authentication server and a directory server. Further, the image processing apparatus includes, for example, a printer, a digital multifunction peripheral and other devices.

The management server 101 includes a control apparatus communication device unit 102 and a mass-storage device unit 103.

The management server 101 transmits management information such as user information and device information to a plurality of image processing apparatuses 107 connected to the control apparatus communication device unit 102. The management information is stored in the mass-storage device unit 103.

The image processing apparatus 107 includes an image processing apparatus communication device unit 108, a storage device unit 109, and an input/output device unit 110.

The image processing apparatus 107 inquires the management server 101 connected to the image processing apparatus communication device unit 108 about management information that is input from the input/output device unit 110. Further, the image processing apparatus 107 stores a part of the management information stored in the management server 101 in the storage device unit 109.

An all users information list 104 is management information stored in the mass-storage device unit 103, and indicates information about all users in the image processing system.

An all devices information list 105 is management information stored in the mass-storage device unit 103, and indicates information about all the image processing apparatuses connected to the image processing system including the image processing apparatuses 107.

A registered user information list 111 is management information stored in the storage device unit 109, and is a list of user information registered in the image processing apparatus 107.

Registered user information lists 106 of the respective devices are management information stored in the mass-storage device unit 103, and are a set of registered user information lists of the respective image processing apparatuses within the image processing system that includes the image processing apparatus 107. In addition, the registered user information lists 106 of the respective devices are synchronized with the registered user information lists 111 by the transmission from the image processing apparatuses 107 connected to the management server 101, which regularly transmit the registered user information to the management server 101. The registered user information lists 111 and the all users information list 104 are authentication information necessary for the user authentication.

Figure 2:
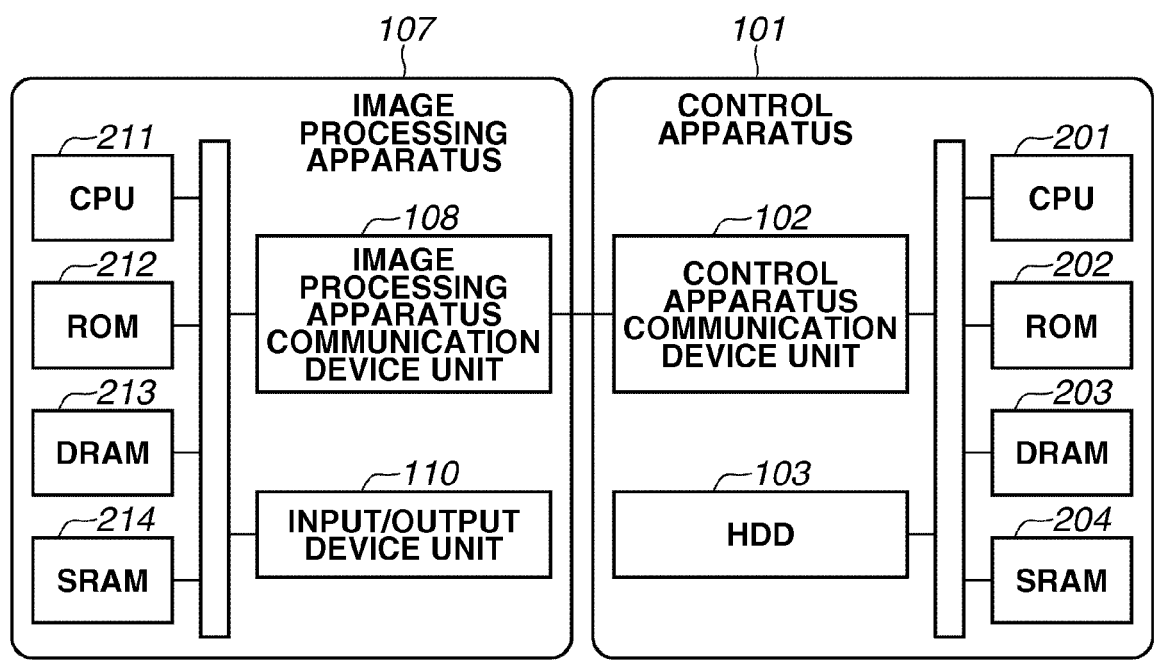
FIG. 2 illustrates an example of a hardware configuration diagram of a management apparatus and an image processing apparatus in an image processing system in which the management apparatus and the image processing apparatus are connected by a network according to an exemplary embodiment of the present invention.

FIG. 2 illustrates a hardware configuration diagram of the management apparatus and the image processing apparatus in the image processing system in which the management apparatus and the image processing apparatus are connected by the network according to the exemplary embodiment of the present invention.

In the management server 101, a central processing unit (CPU) 201 is a control unit of the management server 101 and controls the entire apparatus. A read-only memory (ROM) 202 stores a control program of the CPU 201.

A dynamic random-access memory (DRAM) 203 is used as a work area of the CPU 201. A static random access memory (SRAM) 204 stores temporary information and setting values used by the management server 101.

The control apparatus communication device unit 102 is an interface unit of a network line such as a local area network (LAN), and used for communication with the image processing apparatus 107.

The mass-storage device unit (hard disk drive (HDD)) 103 is a storage unit of the management server 101 and stores the user information and the device information.

In the image processing apparatus 107, the image processing apparatus communication device unit 108 is an interface unit of a network line such as LAN and used for communication with the management server 101.

The input/output device unit 110 is an interface unit for a user to set a value to the image processing apparatus 107, as well as, to notify the user of values and messages from the image processing apparatus 107. Further, the input/output device unit 110 is used by the user to set a user identification (ID) and a password in a login function, and used by the image processing apparatus 107 to notify the user of a user authentication processing result.

A CPU 211 is a control unit of the image processing apparatus 107 and controls the entire image processing apparatus 107. A ROM 212 stores a control program of the CPU 211. A DRAM 213 stores variables of the control program of the CPU 211.

A SRAM 214 stores a buffer for each process of the image processing apparatus 107. In addition, the SRAM 214 serves as a storage device unit for storing user information registered in the image processing apparatus 107.

FIGS. 3A and 3B illustrate examples of formats of the management information used in the image processing system of FIG. 1.

A user information list illustrated in FIG. 3A contains the followings items.

A user name 301 and a user ID 302 denote a name and an identification number of a user, respectively. A password 303 is a password which is associated with the user name 301 and the user ID 302 and used in user authentication processing of the login function.

A usage frequency 304 of each image processing apparatus is number information obtained by converting usage frequency (or a number of uses) of the image processing apparatuses 107 into a numerical form, and its value is updated each time the user logs in and uses the image processing apparatus.

Function limitation information 305 indicates whether each function of the image processing apparatus 107 is usable by the user. In a case of a prohibited function, even if the image processing apparatus 107 has the function, the user is restricted from using it. The function limitation information 305 is an example of user function information. User area information 306 is location information or area information indicating a location of a user's seat within a building, or an area including the location. The user area information 306 is an example of user location information.

A device information list illustrated in FIG. 3B contains the following items.

A device name 307 and a device ID 308 denote a name and an identification number of the image processing apparatus 107. Function information 309 indicates, for each function, whether the image processing apparatus 107 has the function. The function information 309 is an example of function information of the external device. Device area information 310 is location information or area information indicating an installation location of the image processing apparatus 107, or an area including the location. The device area information 310 is an example of location information of the external device.

In the exemplary embodiments described below, the image processing apparatus 107 is expressed as a device, and the input/output device unit 110 is expressed as a user interface (UI).

Transmission of information when user authentication processing is requested by the device will be described.

FIG. 4 is a flowchart illustrating a procedure for user authentication processing on a device side when the user authentication processing is requested by the device in FIG. 1.

In step S401 in FIG. 4, when a user uses a login function to input a user ID and a password from the UI, the device starts the user authentication processing upon receiving the input.

In step S402, the device retrieves the user ID that has been input in step S401 from the registered user information list 111 stored in the storage device unit 109.

In step S403, if the device finds the user ID that has been input in step S401 from the registered user information list 111 (YES in step S403), then the process proceeds to step S410. If the user ID is not found (NO in step S403), the process proceeds to step S404.

In step S410, the device verifies whether the password that has been input in step S401 matches a password that has been retrieved from registered user information, and notifies the user of a user authentication result from the UI, then terminates the user authentication processing.

In step S404, the device requests the management server to perform the user authentication processing by transmitting the user ID and the password that have been input in step S401 thereto.

In step S405, the device refers to the storage device unit 109 to check whether there is a free data storage space for one piece of user information, and transmits notification indicating whether there is the free data storage space to the management server.

In step S406, the device receives notification indicating whether there is the user ID that has been transmitted in step S404 in the mass-storage device unit 103 of the management server. If the device receives the notification that there is no user ID (NO in step S406), then in step S411, the device notifies the user of occurrence of an error from the UI, and terminates the processing of the flowchart. If the device receives the notification that there is the user ID, then the operation proceeds to step S407.

In step S407, the device receives the user authentication result from the management server, and notifies the user of the result from the UI.

In step S408, the device receives a request (step S510 of FIG. 5) to add the user notified in step S407 to the user information and the registered user information list 111 from the management server. Further, if the device notifies that there is no free data storage space in step S405, the device receives a request (step S509 of FIG. 5) to delete/add specific user information from/to the registered user information list 111 from the management server.

In step S409, the device deletes and adds the user information from and to the registered user information list 111 according to the request received in step S408.

Figure 5:
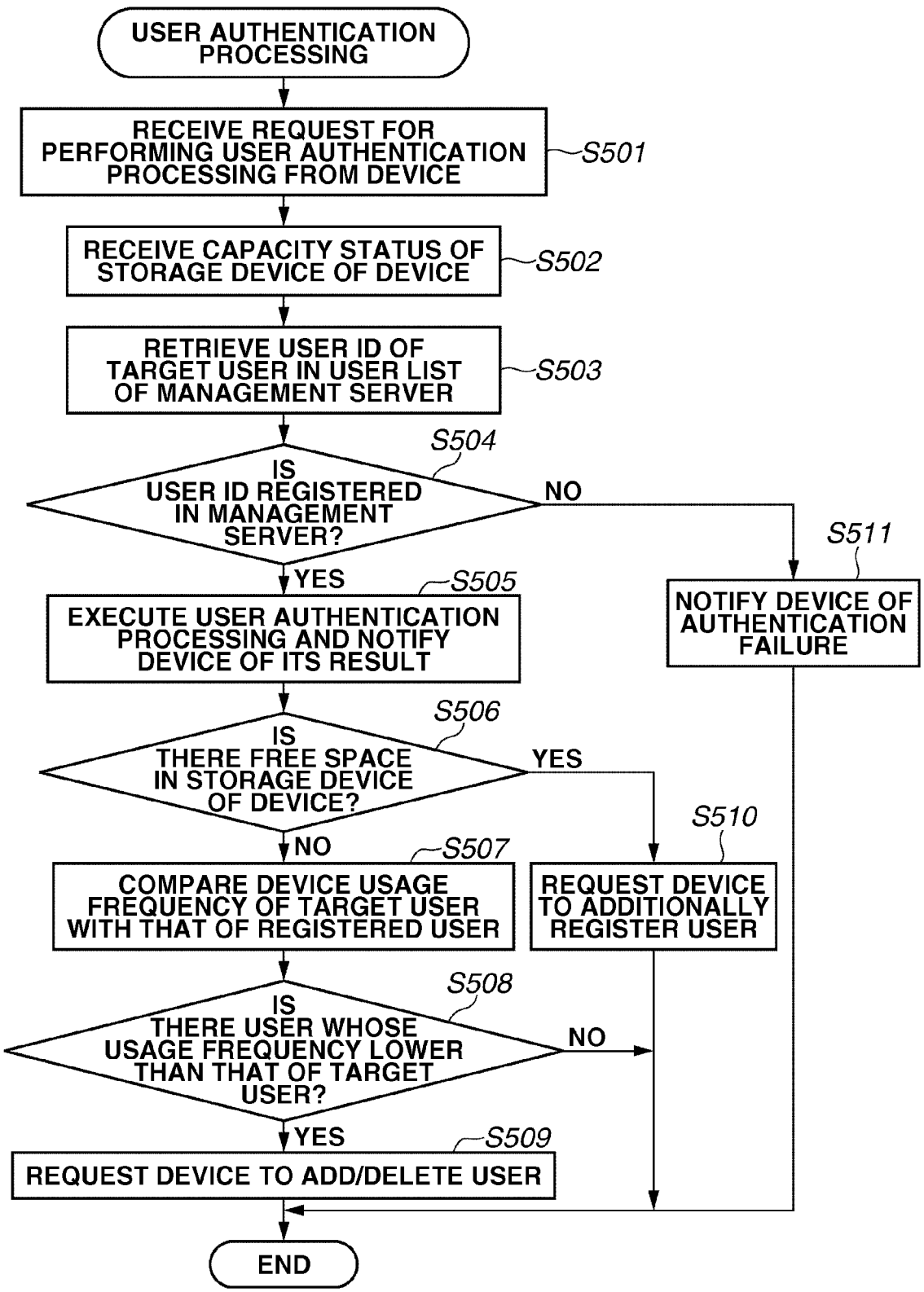
FIG. 5 is a flowchart illustrating a procedure for user authentication processing on a management server side, when user authentication processing is requested by a device in FIG. 1.

FIG. 5 is a flowchart illustrating a procedure for user authentication processing on the management server side, when the user authentication processing is requested by the device in FIG. 1.

In step S501 in FIG. 5, the management server receives the user ID, the password and the request to perform the user authentication processing from the device (step S404 of FIG. 4).

In step S502, the management server receives the notification indicating whether there is a free data storage space for one piece of the user information in the storage device unit 109 from the device (step S405 of FIG. 4).

In step S503, the management server retrieves the user ID received in step S501 from the all users information list 104 stored in the mass-storage device unit 103.

In step S504, if the management server finds the user ID from the all users information list 104 (YES in step S504), then the process proceeds to step S505. If the user ID is not found (NO in step S504), then in step S511, the management server notifies the device of failure of the user authentication processing. Then, the management server terminates the processing of the flowchart in FIG. 5.

In step S505, the management server verifies whether the password received in step S501 matches the password of the user information retrieved in step S503, and notifies the device of the user authentication result.

In step S506, if the management server receives the notification that there is the free data storage space from the device (YES in step S506), then the process proceeds to step S510. If the notification that there is no free space is received (NO in step S506), the process proceeds to step S507.

In step S510, the management server transmits the user information retrieved in step S503 to the device, and request the device to add the user information to the registered user information list 111. Then, the management server terminates the processing of the flowchart.

In step S507, the management server refers to the user information of the device that is requested to perform the user authentication processing from the registered user information list 111 of each device stored in the mass-storage device unit 103.

The management server compares a usage frequency of the device of each piece of the user information and that of the user retrieved in step S503 by referring to the usage frequency 304 of each image processing apparatus in the all users information list 104. Then, the management server retrieves user information indicating the lowest usage frequency from among pieces of the user information indicating lower usage frequency of the device than the user retrieved in step S503.

In step S508, if the management server finds the user information indicating the lowest usage frequency in retrieval in step S507 (YES in step S508), then the process proceeds to step S509. On the other hand, if the management server does not find the user information indicating the lowest usage frequency (NO in step S508), the management server terminates the processing of the flowchart without requesting the device to add the user information to the registered user information list 111.

In step S509, the management server transmits to the device a request to delete the user information found in the retrieval in step S507 from the registered user information list 111. Further, the management server transmits the user information retrieved in step S503 to the device, and requests to the device to add the user information to the registered user information list 111. Then the management server terminates the processing of the flowchart.

As described above, if the user authentication processing is requested by the device, the management server transmits the user information to the device.

When a user performs authentication using the management server by operating a certain device according to the flowchart of FIG. 5, the management server transmits information for authenticating the user to the device. After this process, a user who logs in the system can perform local authentication on a device that the user logged in, and user authentication processing can be performed more promptly.

Next, transmission of information when the function limitation information 305 of the all users information list 104 in the management information stored in the management server is changed will be described.

Figure 6:
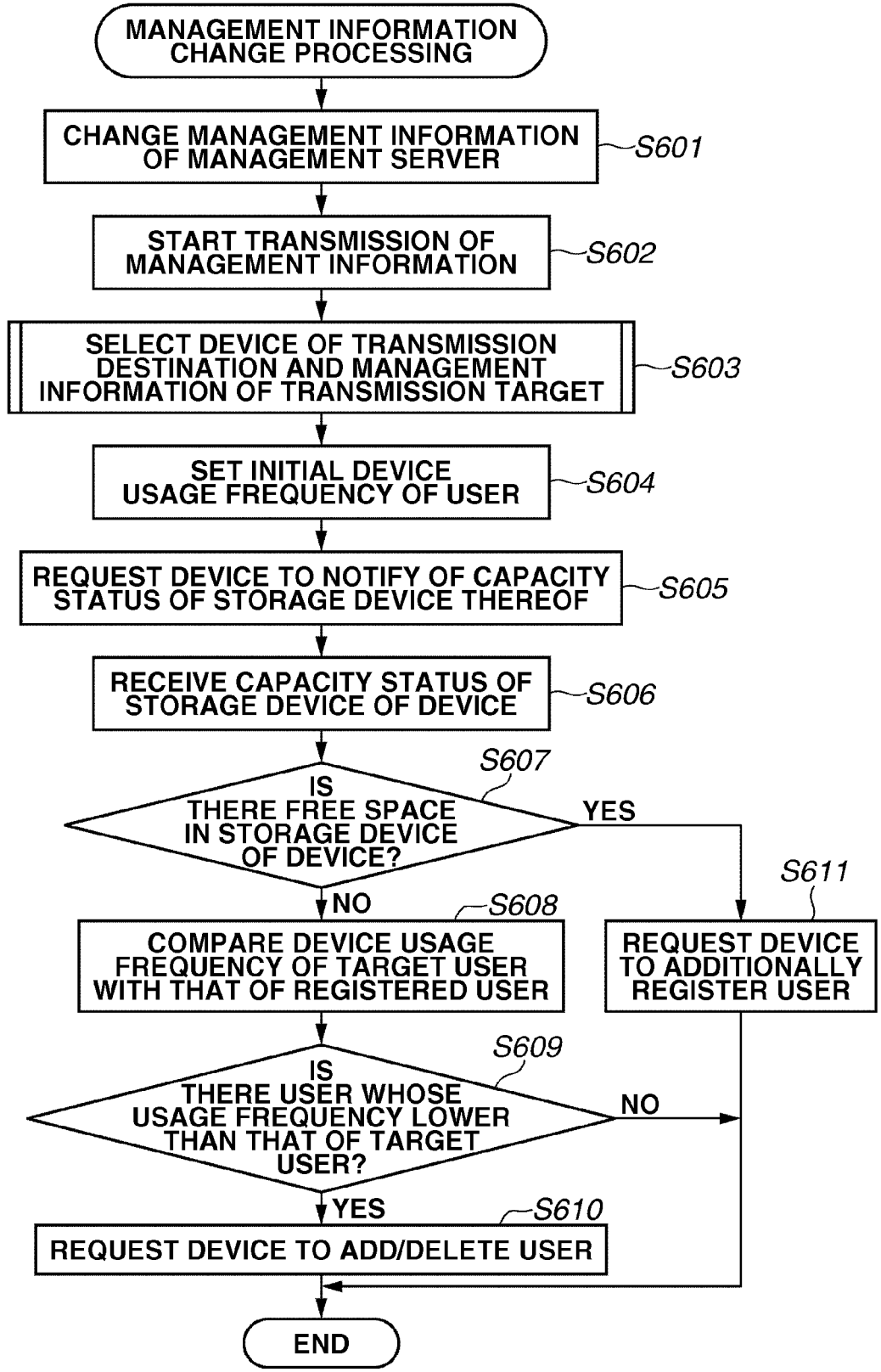
FIG. 6 is a flowchart illustrating a procedure for management information change processing on a management server side when management information stored in the management server in FIG. 1 is changed.

FIG. 6 is a flowchart illustrating a procedure for management information change processing on the management server side, when the management information stored in the management server in FIG. 1 is changed.

In step S601 in FIG. 6, the management server changes a part of the user information and the device information in the management information stored in the mass-storage device unit 103. The management information of the management server may be manually changed by an administrator of the management server, or automatically changed by changing a setting of the device.

In step S602, the management server starts transmitting the user information related to a changed content in step S601.

In step S603, the management server selects a device to be a transmission destination or the management information to be transmitted. The details of step S603 will be separately described in FIGS. 8, 9, 10 and 11.

In step S604, the management server sets an initial value of a usage frequency of the transmission destination device to a specific value, as to the usage frequencies of each device about the user information to be transmitted.

For example, the management server refers to the usage frequency of the transmission destination device from the registered user information list 111 of each device stored in the mass-storage device unit 103, and sets an average value of the usage frequency of the transmission destination device about each user information, as an initial value.

In step S605, the management server transmits to the device a request for notification of whether there is a free data storage space for one piece of the user information in the storage device unit 109 thereof.

In step S606, the management server receives, from the device, the notification of whether there is a free data storage space for one piece of the user information in the storage device thereof.

In step S607, if the management server receives the notification that there is the free data storage space (YES in step S607), then the process proceeds to step S611. If the management server receives the notification that there is no free space (NO in step in S607), then the process proceeds to step S608.

In step S611, the management server transmits to the device the user information of the transmission target and a request to add the user information to the registered user information list 111.

In step S608, the management server refers to the usage frequency of the transmission destination device from the registered user information list 111 of each device stored in the mass-storage device unit 103. The management server compares the usage frequency of the transmission destination device about each user information and that of the transmission target user information. Then, the management server retrieves user information indicating the lowest usage frequency from among pieces of the user information indicating lower usage frequency of the transmission destination device than that of the transmission target user information.

In step S609, if the management server finds the user information indicating the lowest usage frequency in retrieval in step S608 (YES in step S609), then the process proceeds to step S610. On the other hand, if the management server does not find the user information indicating the lowest usage frequency (NO in step S609), the management server transmits to the device a request not to add or delete the user information to/from the registered user information list 111.

In step S610, the management server transmits to the device a request to delete the user information found in the retrieval in step S608 from the registered user information list 111. Further, the management server transmits to the device the user information of the transmission target and a request to add the user information of the transmission target to the registered user information list 111.

In this case, steps S602, S610, and S611 function as a second transmission unit that transmits changed management information to the external device according to a change of the management information transmitted by a first transmission unit. Further, step S603 functions as a selection unit that selects the external device to be the transmission destination and the management information of the transmission target, according to a content of the management information transmitted by the first transmission unit and the second transmission unit.

The selection unit selects the image processing apparatus 107 based on that the area setting information of a user coincides with the area setting information of the image processing apparatus 107, and that the function information of the image processing apparatus 107 matches with the function limitation information of the image processing apparatus 107 of the user. Further, the selection unit selects the image processing apparatus 107 based on that the usage frequency of the image processing apparatuses 107 of the user is higher than that of other image processing apparatuses 107.

Figure 7:
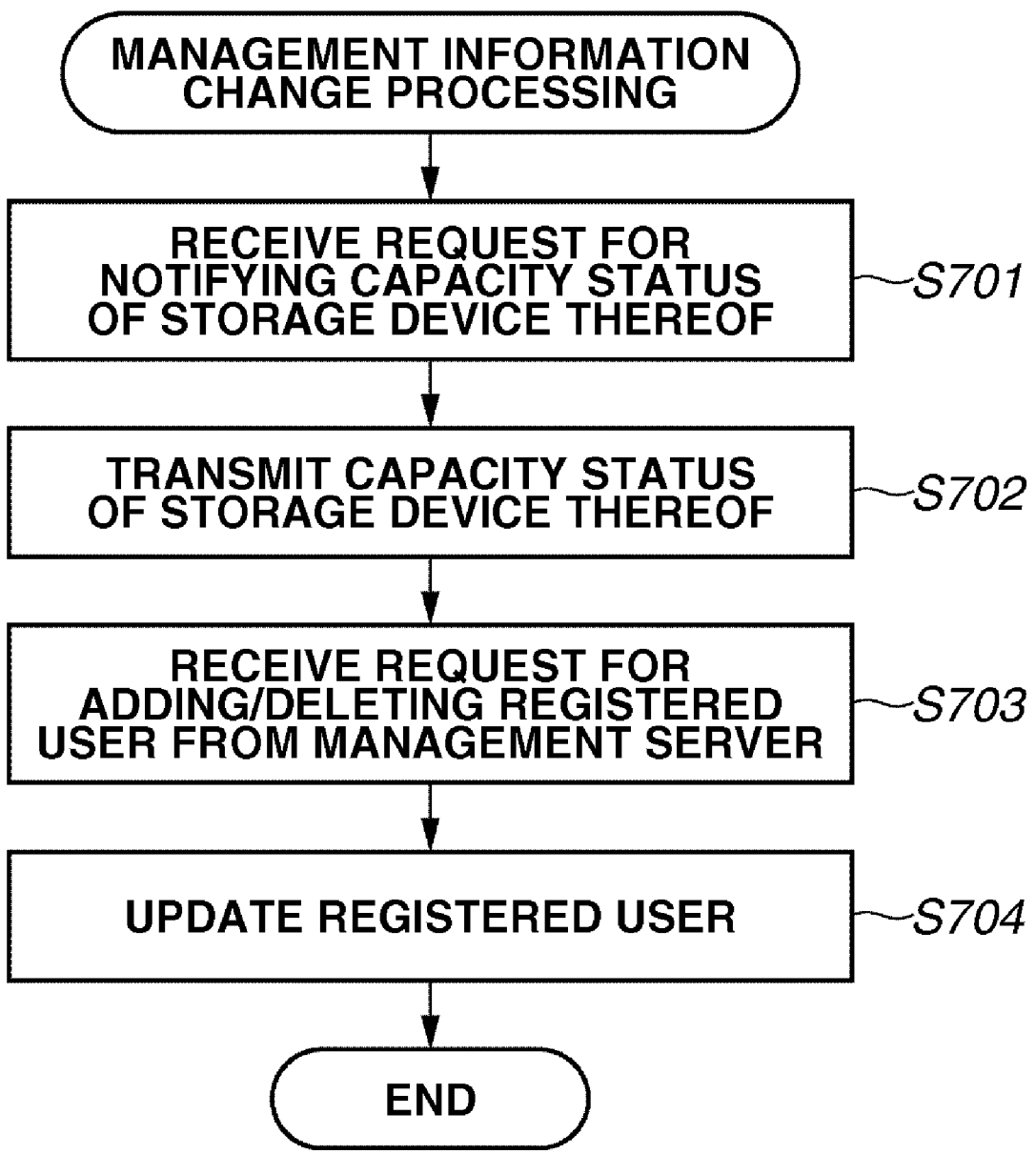
FIG. 7 is a flowchart illustrating a procedure for management information change processing on a device side, when management information stored in a management server in FIG. 1 is changed.

FIG. 7 is a flowchart illustrating a procedure for management information change processing on the device side, when the management information stored in the management server in FIG. 1 is changed.

In step S701 in FIG. 7, the device receives the request (step S605 of FIG. 6) for notification of whether there is a free data storage space for one piece of the user information in the storage device unit 109 from the management server.

In step S702, the device transmits to the management server the notification of whether there is a free data storage space for one piece of user information in the storage device unit 109.

In step S703, the device receives the request (step S610, or step S611 of FIG. 6) to register and/or delete specific user information to/from the registered user information list 111 from the management server.

In step S704, the device deletes and adds the user information from/to the registered user information list 111 according to the request received in step S703.

Figure 8:
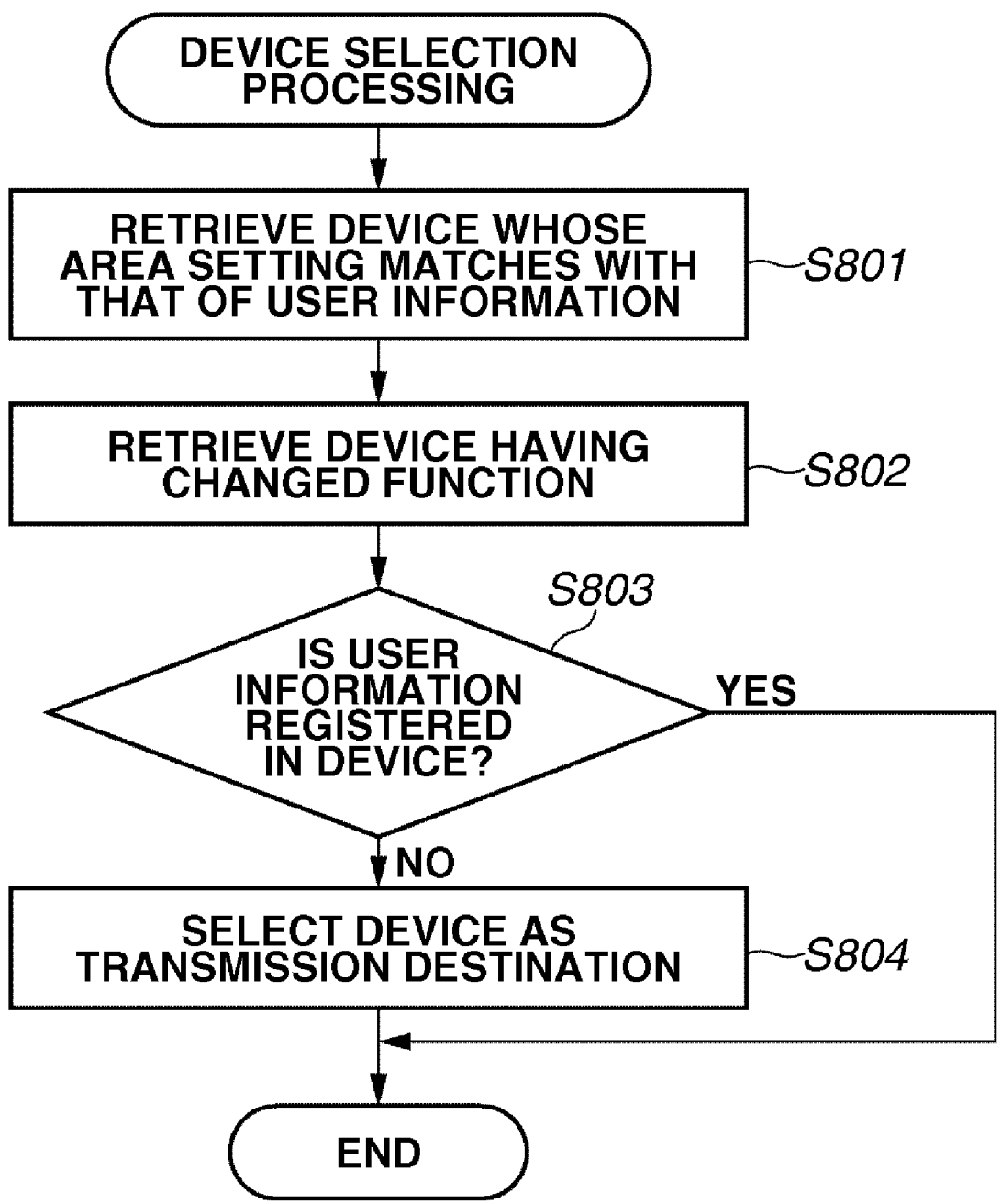
FIG. 8 is a flowchart illustrating a procedure for device selection processing executed in step S603 of FIG. 6, when management information (function limitation information of user information) stored in a management server in FIG. 1 is changed.

According to flowcharts in FIGS. 7 and 8, when the management information of the device is updated according to the change of the management information of the management server, user information indicating a high usage frequency of the device is registered in the device by priority. Consequently, the device is more likely to perform the local authentication, and it can be expected that user authentication processing is promptly performed.

FIG. 8 is a flowchart illustrating a procedure for device selection processing executed in step S603 of FIG. 6, when the function limitation information 305 of the all user information list 104 in the management information stored in the management server in FIG. 1 is changed.

In this case, user information whose function limitation information is changed, becomes transmission target user information. In the function limitation information of the user information, a case where a color printing function is changed from 'prohibited' to 'permitted' will be described as an example. In step S801 in FIG. 8, the management server retrieves device information that has device area information matching with user area information of the transmission target user information by referring to the all devices information list 105 stored in the mass-storage device unit 103.

In step S802, the management server retrieves device information whose color printing function in the function information is changed from the device information retrieved in step S801.

In step S803, the management server refers to the user information of the device retrieved in step S802 from the registered user information list 111 of each device stored in the mass-storage device unit 103.

The management server checks whether there is the transmission target user information in the registered user information list 111 of each device. Then, if the management server finds a device that does not have the transmission target user information (NO in step S803), the process proceeds to step S804 If the management server does not find the device that does not have transmission target user information (YES in step S803), the management server determines that there is no transmission destination device.

In step S804, the management server selects the device that does not have the transmission target user information in step S803 as a transmission destination device.

According to the flowchart in FIG. 8, the management server can transmit user information of the user to a device which has a function that becomes newly available for the user and which is in the same area as the user. Consequently, a device having a high possibility to be used by the user is more likely to perform the local authentication, and it can be expected that user authentication processing is promptly performed.

Next, transmission of information when the user area information 306 of the all users information list 104 in the management information stored in the management server is changed, will be described.

Figure 9:
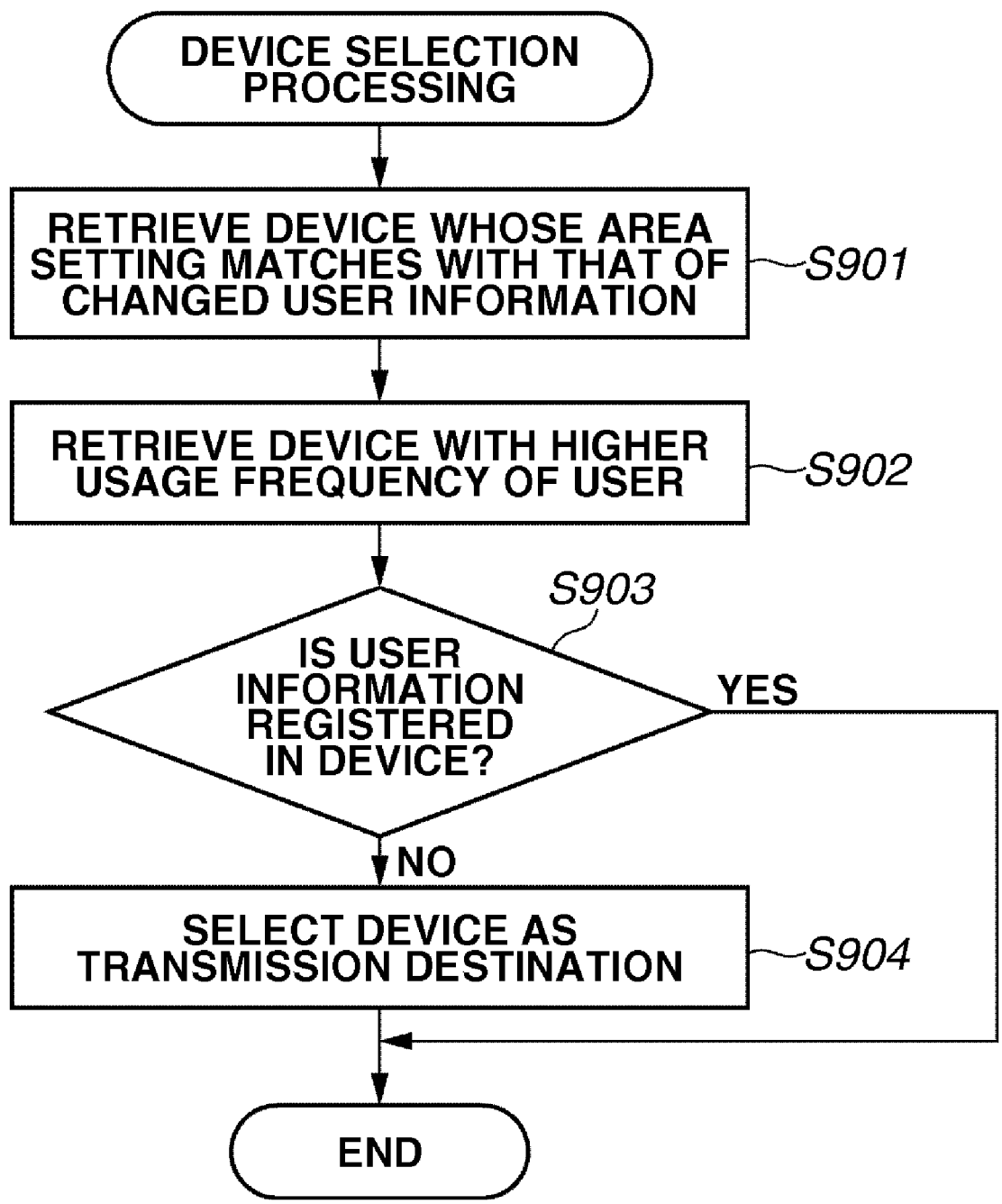
FIG. 9 is a flowchart illustrating a procedure for device selection processing executed in step S603 of FIG. 6, when management information (user area information of user information) stored in a management server in FIG. 1 is changed.

FIG. 9 is a flowchart illustrating a procedure for device selection processing executed in step S603 of FIG. 6, when the user area information 306 of the all users information list 104 in management information stored in the management server in FIG. 1 is changed.

In this case, user information whose user area information is changed becomes the transmission target user information. A case where the user area information 306 of the all users information 104 is changed from a floor A to a floor B will be described as an example.

In step S901 in FIG. 9, the management server retrieves device information whose device area information matches with changed user area information (floor B) of the transmission target user information by referring to the all devices information list 105 stored in the mass-storage device unit 103.

In step S902, the management server refers to a device whose device name matches with that of the device information retrieved in step S901, among usage frequencies of each device of the transmission target user information. Further, the management server retrieves a device with the highest usage frequency from among these devices.

In step S903, the management server refers to the user information of the device retrieved in step S902 in the registered user information list 111 of each device stored in the mass-storage device unit 103.

The management server checks whether there is transmission target user information in the registered user information list 111 of each device. If the management server finds a device that does not have the transmission target user information (NO in step S903), then the process proceeds to step S904. If the management server does not find the device that does not have transmission target user information (YES in step S903), the management server determines that there is no transmission destination device.

In step S904, the management server selects the device that does not have the transmission target user information in step S903 as a transmission destination device.

According to the flowchart of FIG. 9, a user can perform the local authentication by a device installed in an area to which the user moved. Consequently, the user authentication processing can be performed more promptly in a device whose usage frequency becomes higher.

Next, transmission of information when the device area information 310 of the all devices information list 105 in the management information stored in the management server is changed will be described.

Figure 10:
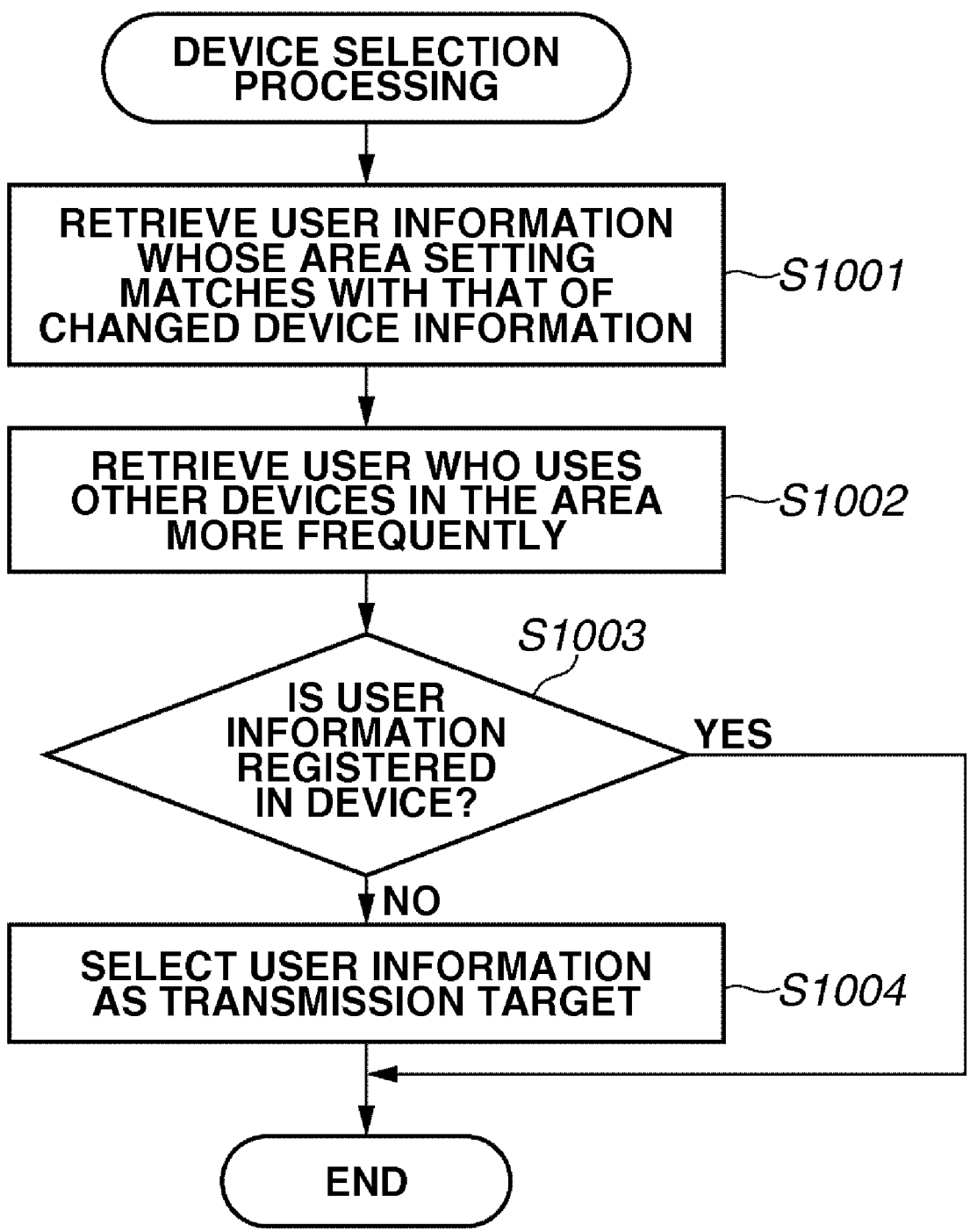
FIG. 10 is a flowchart illustrating a procedure for device selection processing executed in step S603 of FIG. 6, when management information (device area information of device information) stored in a management server in FIG. 1 is changed.

FIG. 10 is a flowchart illustrating a procedure for device selection processing executed in step S603 of FIG. 6, when the device area information 310 of the all devices information 105 in the management information stored in the management server in FIG. 1 is changed.

In this case, a device whose device area information is changed, becomes the transmission destination device. A case where the device area information of the device information is changed from a floor A to a floor B will be described as an example.

In step S1001, the management server retrieves user information whose user area information matches with changed device area information (floor B) of the device information of the transmission destination device, by referring to the all users information list 104 stored in the mass-storage device unit 103.

In step S1002, the management server refers to the all devices information list 105 stored in the mass-storage device unit 103 and a usage frequency of each device of the user information retrieved in step S1001.

The management server refers to a usage frequency of the device whose device area information is floor B from the usage frequency of each device of the user information retrieved in step S1001. Further, the management server retrieves one or a plurality of the user information in a descending order from the highest usage frequency.

In step S1003, the management server refers to the user information of the transmission destination device in the registered user information list 111 of each device stored in the mass-storage device unit 103. The management server checks whether there is the user information retrieved in step S1002.

If the management server finds a device that does not have the user information retrieved in step S1002 (NO in step S1003), then the process proceeds to step S1004. If the management server does not find the device that does not have transmission target user information (YES in step S1003), the management server determines that there is no transmission target user.

In step S1004, the management server selects the user information that has been found in the registered user information list 111 in step S1003 as transmission target user information.

According to the flowchart of FIG. 10, a device whose device area information is changed can perform the local authentication of a user who has a high usage frequency in the area where the device is installed. Consequently, the user authentication can be performed more promptly.

Next, transmission of information when the function information 309 of the all devices information list 105 in the management information stored in the management server is changed will be described.

FIG. 11 is a flowchart illustrating a procedure for device selection processing executed in step S603 of FIG. 6, when the function information 309 of the all devices information list 105 in the management information stored in the management server in FIG. 1 is changed.

In this case, a device whose function information is changed, becomes the transmission destination device. A case where the transmission function in the function information of the device is changed from "×" (without function) to "○" (with function) will be described as an example.

In step S1101 in FIG. 11, the management server retrieves user information whose area information set in the user area information 306 matches with an area where the device whose function information is changed is installed by referring to the all users information list 104 stored in the mass-storage device unit 103.

In step S1102, the management server retrieves user information in which changed transmission function is permitted in the function limitation information of the user information, from the user information retrieved in step S1101.

In step S1103, the management server refers to a usage frequency of transmission destination device with respect to a usage frequency of each device of the user information retrieved in step S1102. Further, the management server retrieves one or a plurality of the user information in a descending order from the highest usage frequency.

In step S1104, the management server refers to the user information of the transmission destination device in the registered user information list 111 of each device stored in the mass-storage device unit 103.

The management server checks whether the transmission destination device has the user information retrieved in step S1103. If the management server finds the transmission destination device that does not have the user information retrieved in step S1103 (NO in step S1104), then the process proceeds to step S1105. If the management server does not find the transmission destination device that does not have the user information retrieved in step S1103 (YES in step S1104), then the management server determines that there is no transmission target user.

In step S1105, the management server selects the user information found in the registered user information list 111 in step S1104 as transmission target user information.

According to the flowchart of FIG. 11, the local authentication can be performed for a user who is permitted to use a function which is newly provided to a device and has a high usage frequency in the device. Consequently, the user authentication processing can be performed more promptly.

A variety of exemplary embodiments is described above in detail, although the present invention may be applied to a system comprised of a plurality of devices, or an apparatus comprised of one device, for example, a scanner, a printer, a personal computer (PC), a copying machine, a multifunction peripheral and a facsimile apparatus.

The present invention can be achieved by directly or remotely supplying a control program for achieving each function of the above-described exemplary embodiments to a system or an apparatus, and reading and executing the supplied program codes by a computer included in the system or the apparatus.

Therefore, the program codes themselves of the control program installed in the computer and the above-described apparatus for achieving functions and processes of the present invention by the computer and the above-described apparatus may constitute the present invention. In other words, a control program for achieving the above-described functions and processes constitutes the present invention.

In this case, if it has an actual function of the program, the program can take any form such as an object code, a program executed by an interpreter, and script data supplied to an operating system (OS)

A storage medium for supplying program includes, for example, a flexible disk, a hard disk, an optical disk, a magnet-optical disk (MO), a compact disk read-only memory (CD-ROM), a compact disk recordable (CD-R), a compact disk rewritable (CD-RW). Additionally, the storage medium also includes a magnetic tape, a non-volatile memory card, a ROM, and a digital versatile disk (DVD) (a DVD-ROM and a DVD-R).

The program may be downloaded from a website on the Internet/intranet by using a browser of a client computer. More specifically, the computer program itself or a compressed file including an automatic installing function of the present invention may be downloaded from the website to a storage medium such as a hard disk. Moreover, the functions and processes of the present invention can be achieved by dividing the program codes constituting the program of the present invention into a plurality of files and downloading each file from different websites. In other words, a world wide web (WWW) server that allows a plurality of users to download the program files for achieving the functions and processes of the present invention by the computer may constitute the present invention.

Moreover, the program of the present invention can be encrypted and stored in a storage medium such as a CD-ROM to be distribute to users. In this case, a user who satisfies a predetermined condition is allowed to download key information for decrypting the encrypted program from a website via the Internet/intranet. The encrypted program can be decrypted by using the key information, executed, and installed in the computer.

Moreover, the functions of the above-described exemplary embodiments may be achieved by executing the program codes read by the computer. In addition, an OS or the like that running on a computer may execute a part or all of the actual processes according to instructions of the program codes. In this case, the functions of the above-described exemplary embodiments can be achieved by that process.

Furthermore, the program read from a storage medium may be written in a memory provided in a function expansion board inserted into a computer or a function expansion unit connected the computer. Then a CPU provided in the function expansion board or the function expansion unit may execute a part or all of the actual processes according to the instruction of the program. In this way, the functions of the exemplary embodiments described above may be implemented.

According to the exemplary embodiments, the management server 101 can optimally transmit management information including user information and device information to the image processing apparatus 107 according to usage frequency, area setting and function limitation.

Thus, a user who uses the image processing apparatus 107 frequently can use local authentication at high speed when using a login function. Further, even when area setting and function limitation information are changed, and the user uses the image processing apparatus 107 that the user has not used frequently, the user can use the local authentication at high speed when using the login function.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-124616 filed May 12, 2008, which is hereby incorporated by reference herein in its entirety.

What is claimed is:

1. A management apparatus capable of communicating with a plurality of external devices comprising:
 a storage unit configured to store management information including authentication information for authenticating a user of the external device;
 a first transmission unit configured to transmit an authentication result of the user in the external device and user information necessary for authenticating the user in the external device among the management information, to the external device by referring to the management information stored in the storage unit in response to a request from the external device;
 a selection unit configured to, when a content of the management information is changed, select at least one of the plurality of external devices to be a transmission destination of the changed management information based on the changed content of the management information; and
 a second transmission unit configured to transmit the changed management information to the external device selected by the selection unit
 wherein the management information further includes user location information which is location information associated with each of a plurality of users, and external device location information indicating an installation location of each of the plurality of external devices, and
 the selection unit selects at least one of the plurality of external devices whose external device location information matches with the user location information in the changed management information.

2. The management apparatus according to claim 1, wherein each of the plurality of external devices has a plurality of functions, the management information further includes user function information which indicates usable functions among the plurality of functions provided by the external device and is set in association with each of the plurality of users, and
 the selection unit selects, when a content of the user function information included in the management information is changed, the external device having a function that has become usable by the change of the user function information.

3. The management apparatus according to claim 1, wherein each of the plurality of external devices has a plurality of functions, the management information further includes external device function information indicating types of functions that are included in each of the plurality of external devices, and
 the selection unit selects, when a content of the external device function information included in the management information is changed, the external device that has been subjected to the change of the external device function information.

4. The management apparatus according to claim 1, wherein the management information further includes number information which indicates a number of times that the user used the external device and is associated with each of the plurality of users, and
 the selection unit selects the external device that has a large usage frequency included in the changed management information.

5. A method for controlling a management apparatus which can communicate with a plurality of external devices and comprises a storage unit configured to store management information including authentication information for authenticating a user of the external device, the method comprising:
 transmitting an authentication result of the user in the external device and user information necessary for authenticating the user in the external device among the management information, to the external device by referring to the management information stored in the storage unit in response to a request from the external device;
 when a content of the management information is changed, selecting at least one of the plurality of external devices to be a transmission destination of the changed management information based on the content of the management information; and transmitting the changed management information to the selected external device, wherein the management information further includes user location information which is location information associated with each of a plurality of users, and external device location information indicating an installation location of each of the plurality of external devices, and at least one of the plurality of external devices whose external device location information matches with the user location information in the changed management information is selected.

6. A non-transitory storage medium storing a program for executing a method for controlling a management apparatus which can communicate with a plurality of external devices and comprises a storage unit configured to store management information including authentication information for authenticating a user of the external device, the method comprising:

transmitting an authentication result of the user in the external device and user information necessary for authenticating the user in the external device among the management information, to the external device by referring to the management information stored in the storage unit in response to a request from the external device;

when a content of the management information is changed, selecting at least one of the plurality of external devices to be a transmission destination of the changed management information based on the content of the management information; and transmitting the changed management information to the selected external device, wherein the management information further includes user location information which is location information associated with each of a plurality of users, and external device location information indicating an installation location of each of the plurality of external devices, and at least one of the plurality of external devices whose external device location information matches with the user location information in the changed management information is selected.

* * * * *